US010441896B2

(12) United States Patent
Naito et al.

(10) Patent No.: US 10,441,896 B2
(45) Date of Patent: Oct. 15, 2019

(54) METHOD AND APPARATUS FOR EXTRACTION OF OIL FROM PLANTS

(71) Applicant: Nakatomi Trading, LLC, Portland, OR (US)

(72) Inventors: John C Naito, Portland, OR (US); Kyler R Buck, Portland, OR (US)

(73) Assignee: Nakatomi Trading, LLC, Portland, OR (US)

( * ) Notice: Subject to any disclaimer, the term of this patent is extended or adjusted under 35 U.S.C. 154(b) by 29 days.

(21) Appl. No.: 15/881,001

(22) Filed: Jan. 26, 2018

(65) Prior Publication Data

US 2019/0232191 A1    Aug. 1, 2019

(51) Int. Cl.
| | |
|---|---|
| *B01D 3/10* | (2006.01) |
| *C11B 1/10* | (2006.01) |
| *C11B 9/02* | (2006.01) |
| *B01D 3/40* | (2006.01) |
| *B01D 11/02* | (2006.01) |
| *B01D 5/00* | (2006.01) |

(52) U.S. Cl.
CPC ............... *B01D 3/10* (2013.01); *B01D 3/106* (2013.01); *B01D 3/40* (2013.01); *B01D 5/006* (2013.01); *B01D 11/02* (2013.01); *C11B 1/10* (2013.01); *C11B 9/025* (2013.01); *C11B 9/027* (2013.01)

(58) Field of Classification Search
CPC .......... B01D 3/10; B01D 3/106; B01D 5/006; C11B 1/10; C11B 9/025; C11B 9/027
See application file for complete search history.

(56) References Cited

U.S. PATENT DOCUMENTS

| | | | | |
|---|---|---|---|---|
| 5,516,923 A | * | 5/1996 | Hebert | ................. B01D 11/028 554/11 |
| 8,092,752 B2 | | 1/2012 | Davis | |
| 9,327,210 B1 | | 5/2016 | Jones | |
| 2005/0203305 A1 | * | 9/2005 | Britt | .......................... C11B 1/10 554/8 |
| 2011/0133120 A1 | | 6/2011 | Mcghee | |
| 2013/0177692 A1 | * | 7/2013 | Wensing | ................... C11C 1/08 426/601 |
| 2014/0369893 A1 | * | 12/2014 | Ellis | ................... B01D 11/0207 422/119 |
| 2016/0030860 A1 | * | 2/2016 | McGhee | ............ B01D 11/0207 422/116 |

* cited by examiner

*Primary Examiner* — Renee Robinson
(74) *Attorney, Agent, or Firm* — Rowan Tels LLC

(57) ABSTRACT

A plant oil extraction system is disclosed utilizing a novel dual vapor recovery scheme and pressure differentials and valve timing conducive to continuous operation.

4 Claims, 12 Drawing Sheets

METHOD AND APPARATUS FOR EXTRACTION OF OIL FROM PLANTS

BACKGROUND

One of the main methods existing today for extracting oil from plants is solvent-based extraction, in which the plant material containing the extractable compounds is bathed or washed in a solvent. The solvent uptakes the extractable compounds from the plant material and combines the plant material in a solution with the solvent. The compound solution is then purified to remove the solvent and recover the desired extracted compound(s). Often, the purification process involves heating the solution to "boil off" or volatilize the solvent from the solution, leaving the extracted compound(s) behind. Such extraction methods usually use a solvent having a lower boiling point than that of the products so that the solvent can be boiled off without removing or damaging the extracted compound(s).

Existing methods of this type may exhibit low throughput due to bottlenecks at the solvent recovery stage, and frequent process interruptions as solvent is restocked (due to process losses).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
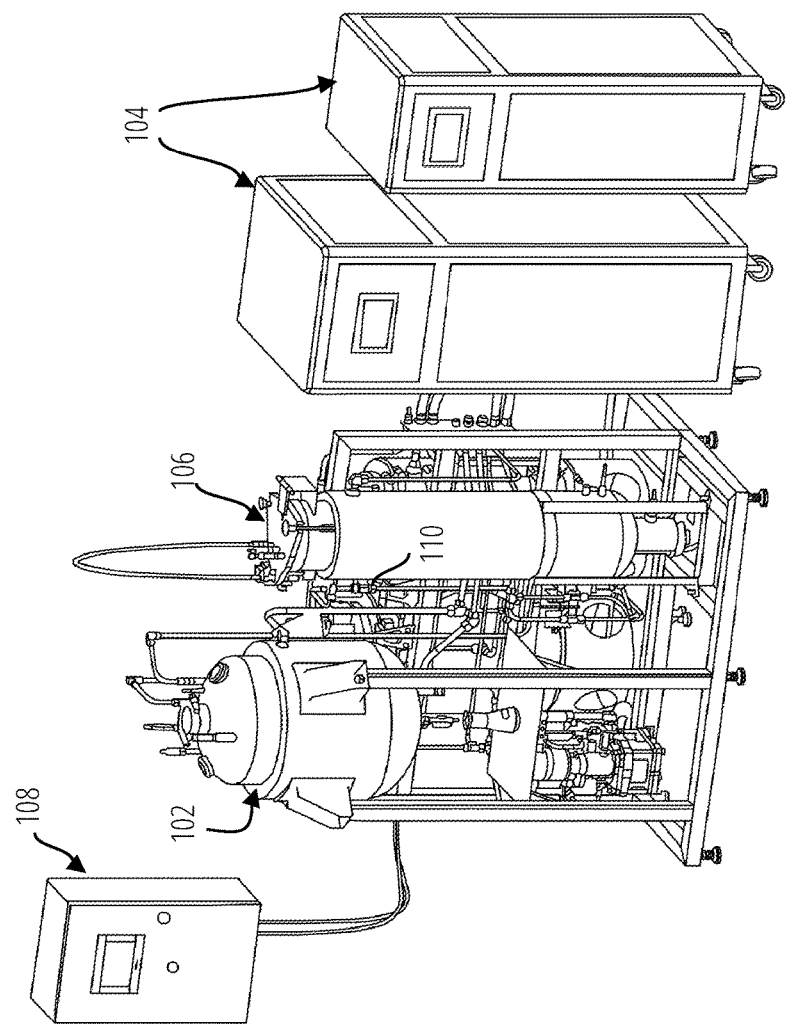
FIG. 1 illustrates a front perspective view of a plant oil extraction system 100 in accordance with one embodiment.
Figure 2:
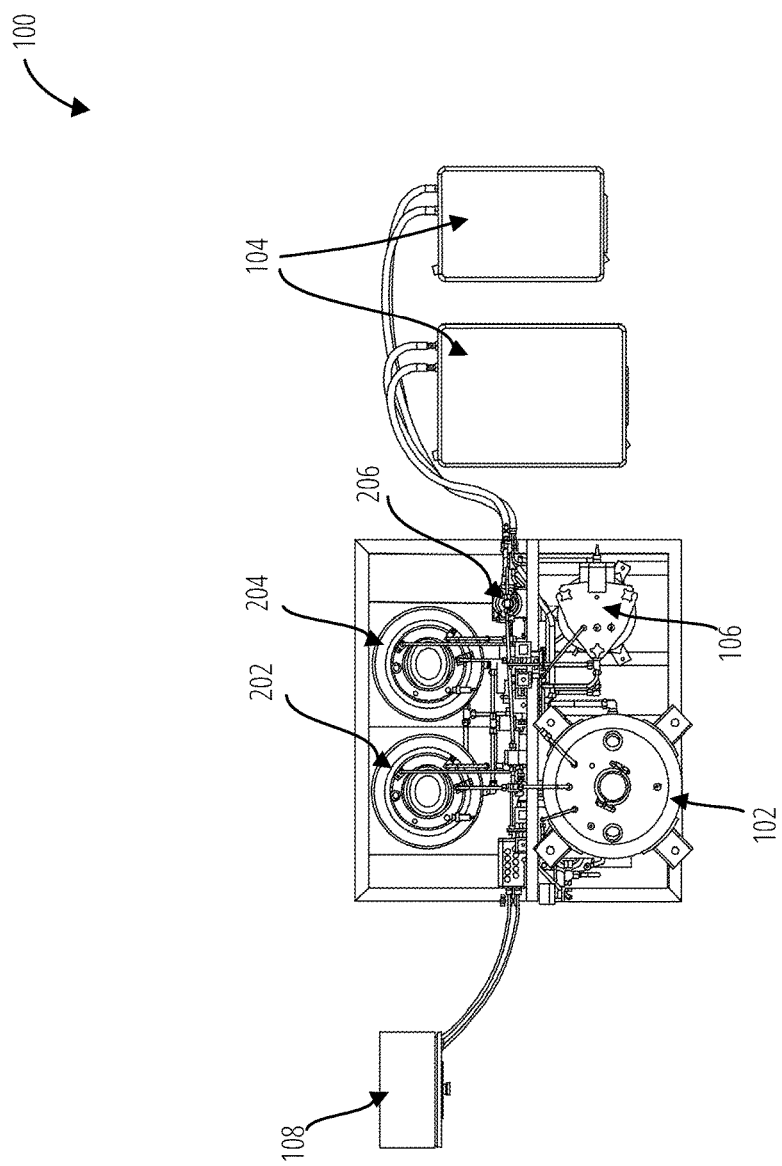
FIG. 2 illustrates a top view of plant oil extraction system 100.
Figure 3:
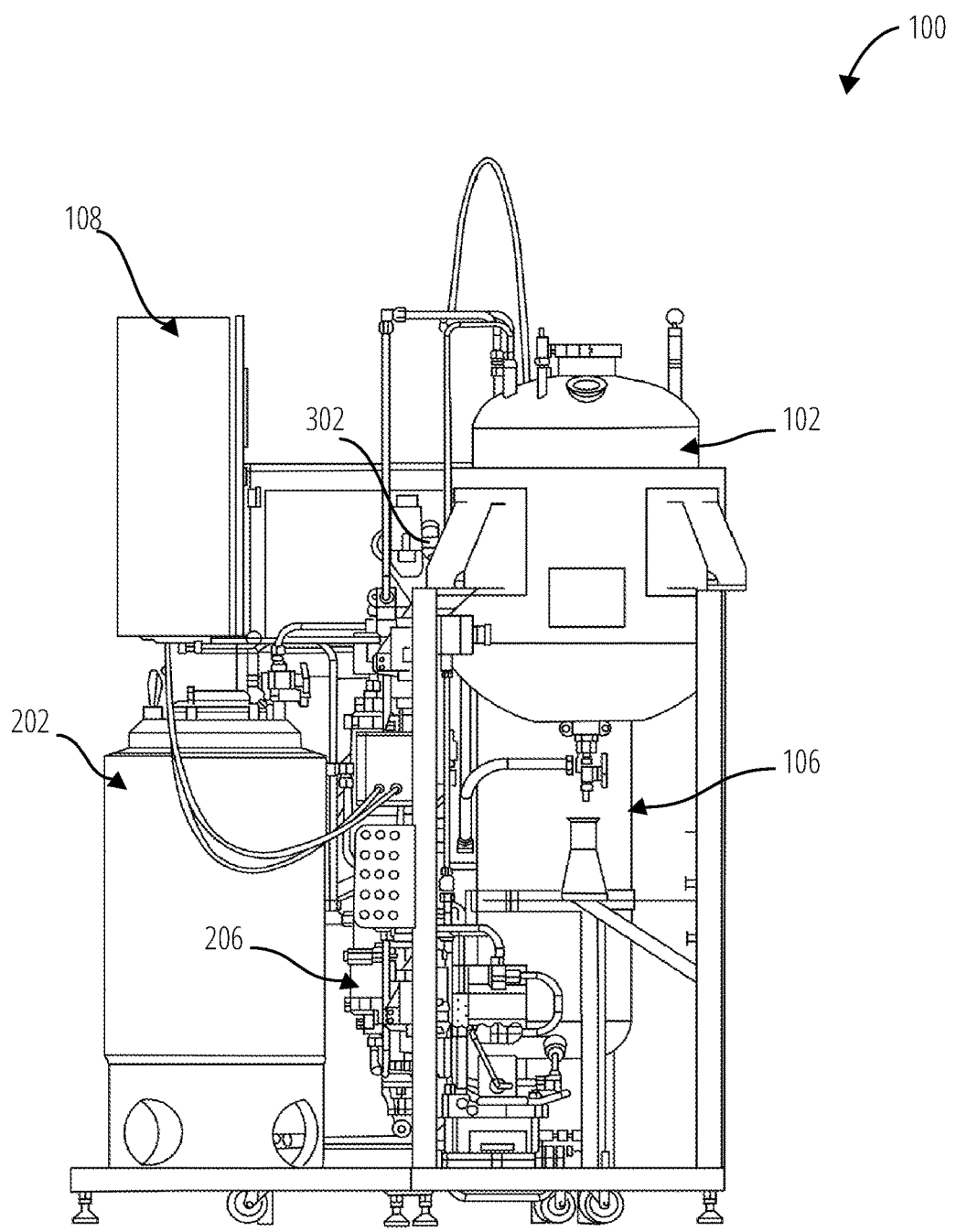
FIG. 3 illustrates a side view of the plant oil extraction system 100.
Figure 4:
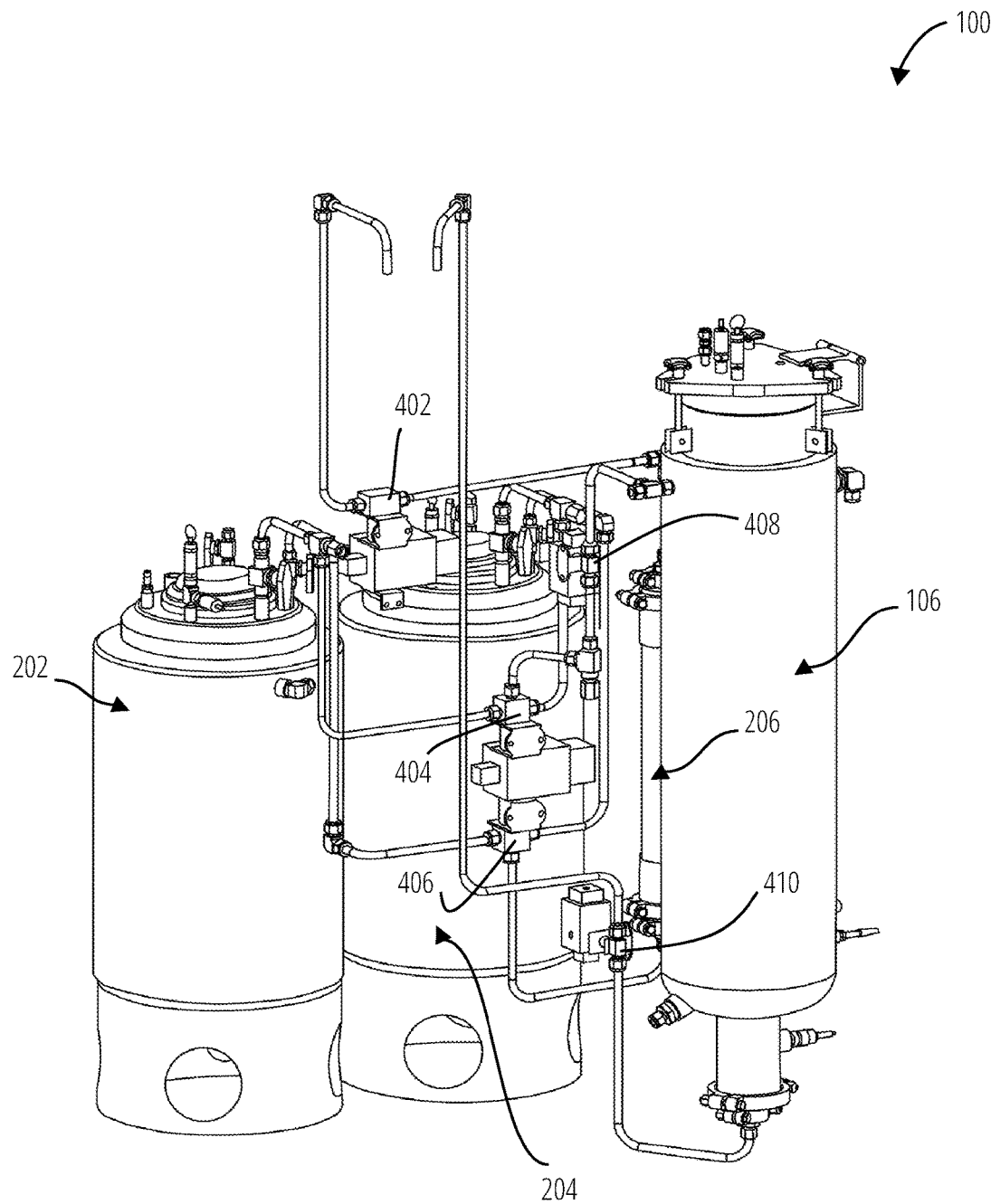
FIG. 4 shows another view depicting the reaction chamber 106, first solvent tank 202, second solvent tank 204, and condenser 206 of the plant oil extraction system 100.
Figure 5:
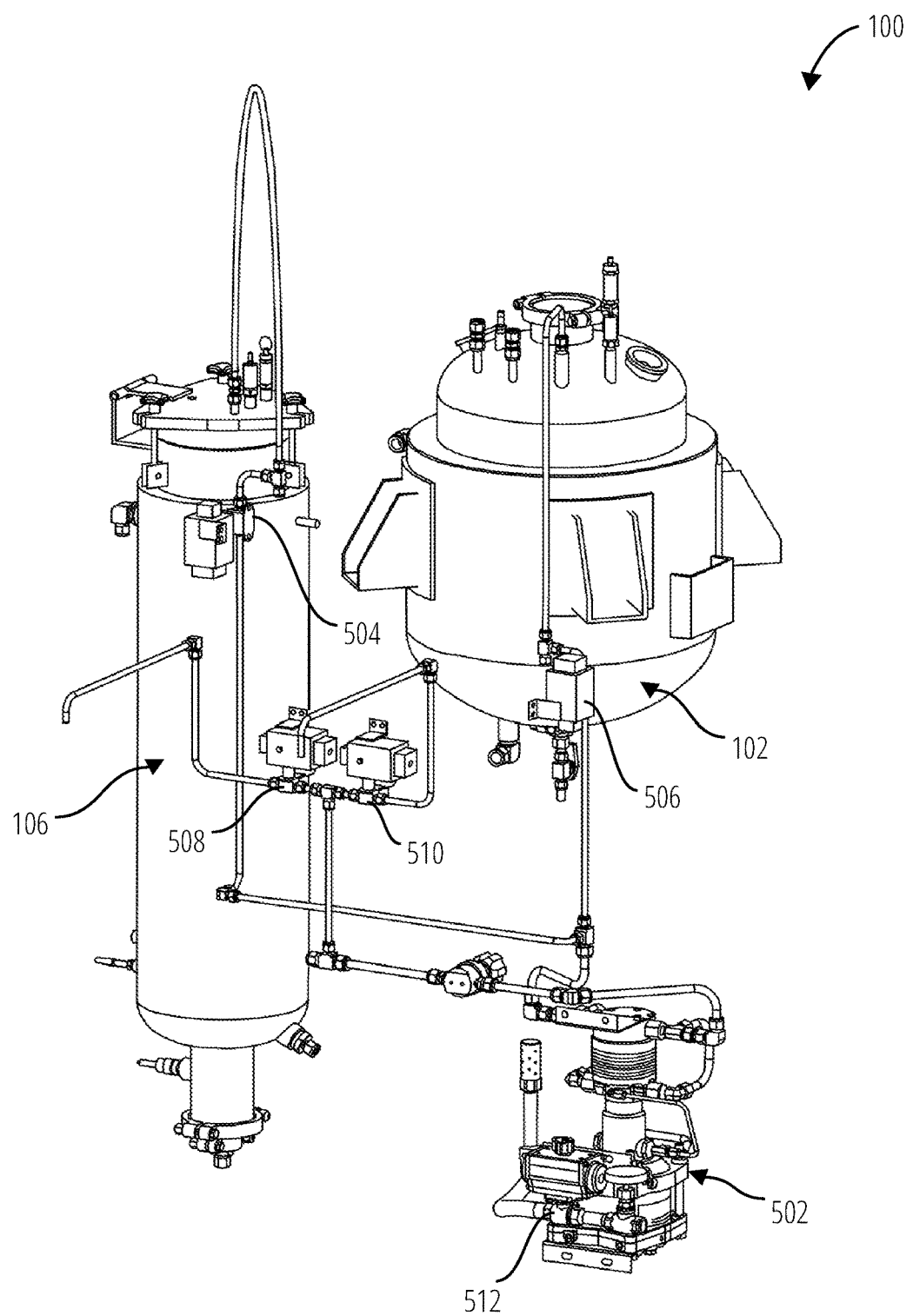
FIG. 5 shows another view depicting the reaction chamber 106, distillation column 102, and the pump 502.
Figure 6:
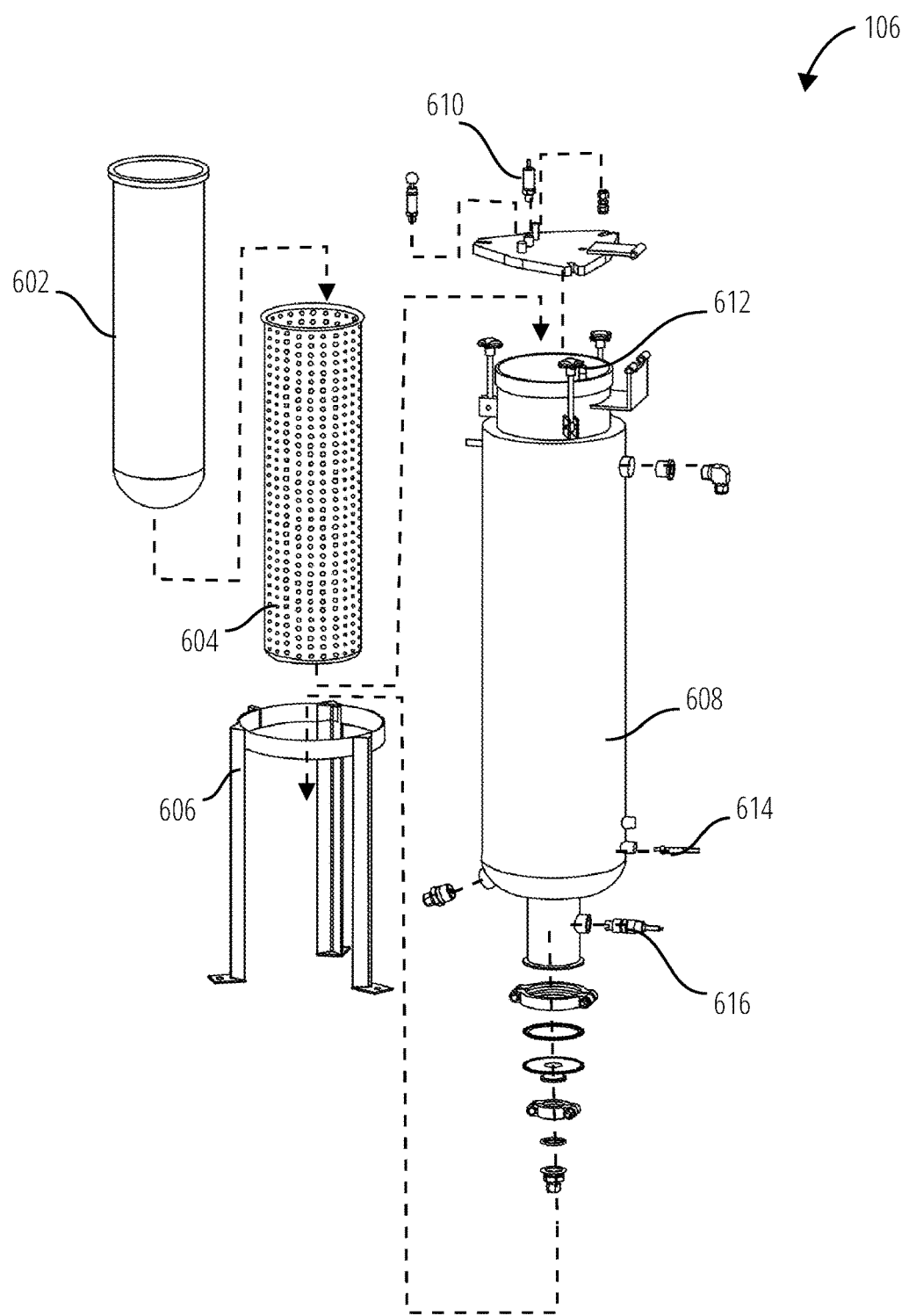
FIG. 6 illustrates the reaction chamber 106 in accordance with one embodiment.
Figure 7:
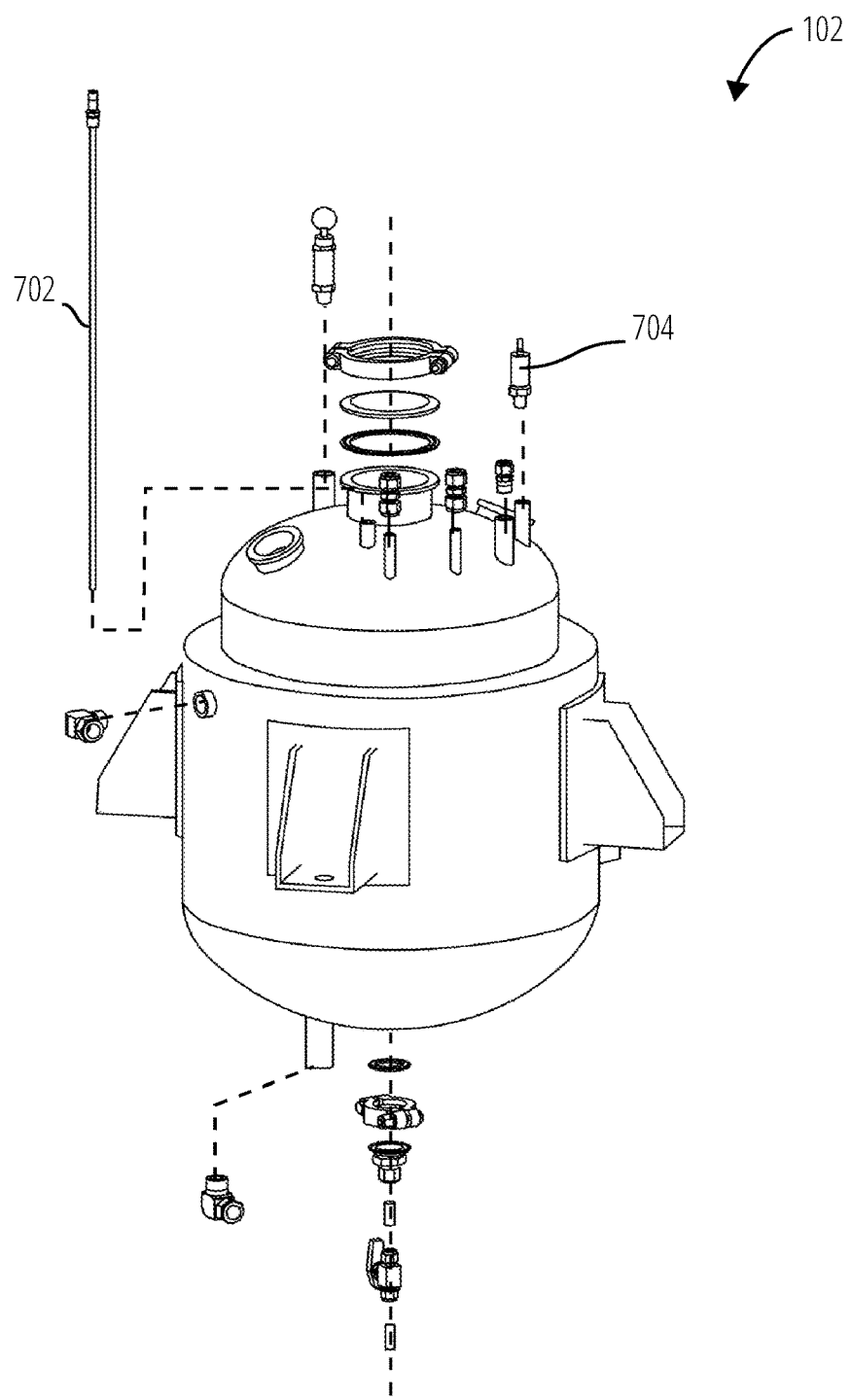
FIG. 7 illustrates the distillation column 102 in accordance with one embodiment.
Figure 8:
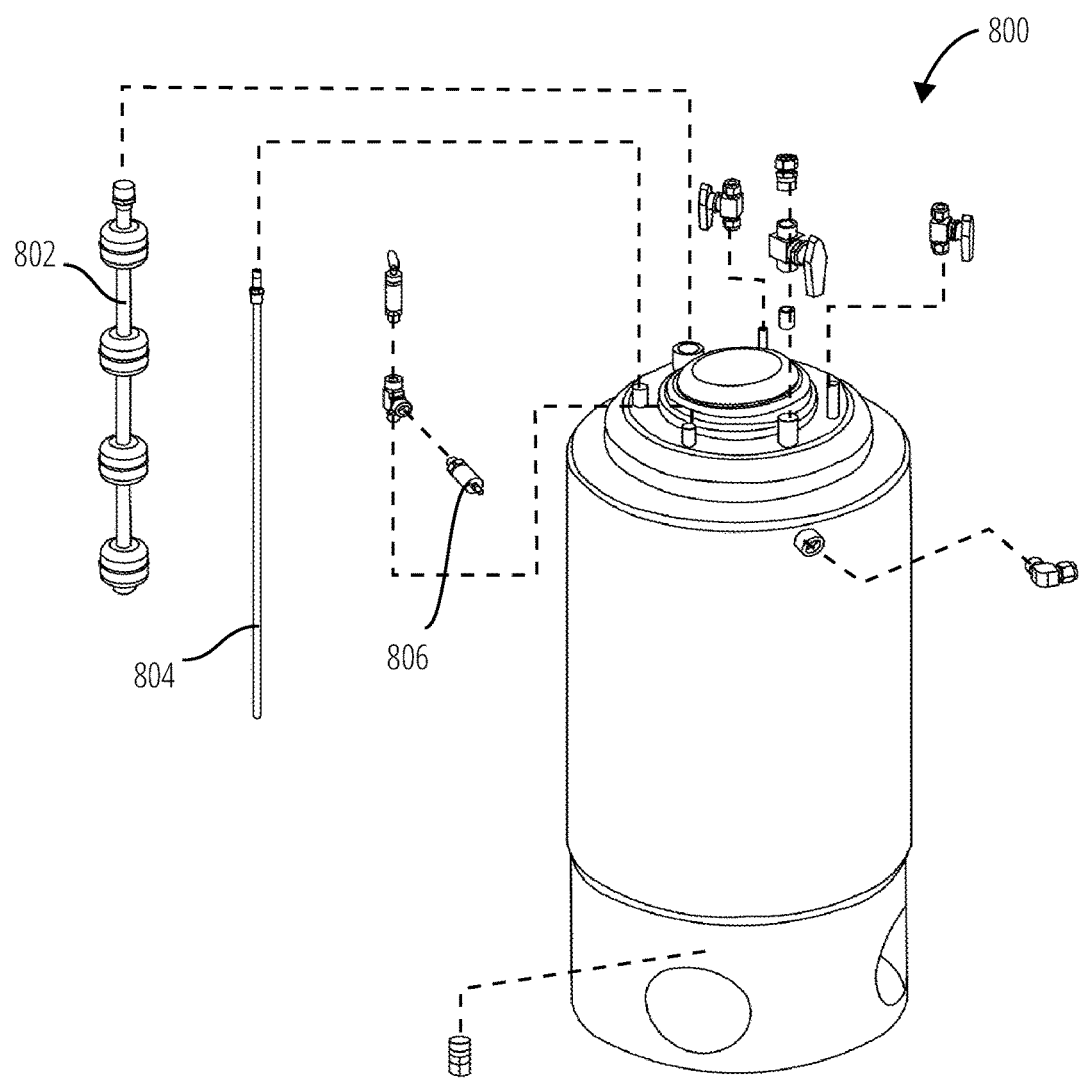
FIG. 8 illustrates a solvent tank 800 embodiment that may be utilized in the plant oil extraction system 100.
Figure 9:
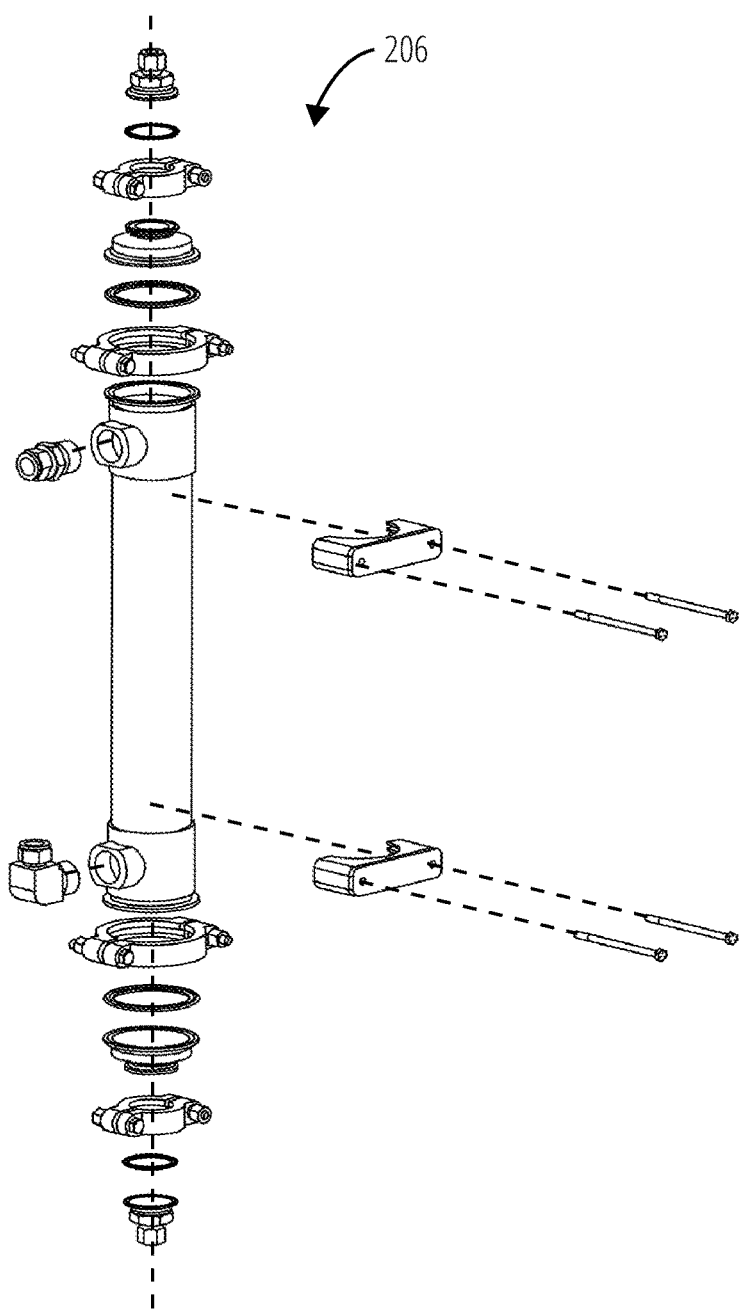
FIG. 9 illustrates a condenser 206 embodiment that may be utilized in the plant oil extraction system 100.

Referring to FIG. 1 through FIG. 9, a plant oil extraction system 100 at a high level comprises a distillation column 102, coolers 104, a reaction chamber 106, a PLC 108 (programmable logic controller), a first solvent tank 202, a second solvent tank 204, a condenser 206, and a pump 502. The reaction chamber 106 includes a filter bag 602, a filter basket 604, a support stand 606, and a reaction vessel 608.

The system also includes various valves, some of which are controlled by the PLC 108. Valves include vacuum valve 110, vacuum valve 302, solvent vapor valve 402, liquid solvent valve 404, liquid solvent valve 406, liquid solvent valve 408, distillation inlet valve 410, solvent vapor valve 504, solvent vapor valve 506, solvent valve 508, solvent valve 510, and compressed air valve 512.

The vacuum valve 110 solvent vapor valve 504 is a 2-way valve that controls the flow of solvent from the pump 502 to the reaction chamber 106. The vacuum valve 110 is actuated to increase pressure in the reaction chamber 106, creating a pressure differential between the reaction chamber 106 and the distillation column 102. This pressure differential provides a motive force for moving solvent from the reaction chamber 106 to the distillation column 102.

The vacuum valve 110 is a 2-way valve that controls the flow of air from the reaction chamber 106 to a vacuum source (e.g., an external vacuum pump). The vacuum valve 110 is operated to evacuate air from the reaction chamber 106 after plant material has been loaded into the reaction chamber 106.

The solvent vapor valve 402 is a 2-way valve that controls flow of solvent vapor from the distillation column 102 to the condenser 206. The solvent vapor valve 402 is operable to allow distilled solvent vapor to move from the distillation column 102 to the condenser 206 and then to the first solvent tank 202 or the second solvent tank 204.

The liquid solvent valve 404 is a 3-way valve that switches flow of liquid solvent from either the first solvent tank 202 or the second solvent tank 204 to the reaction chamber 106.

The liquid solvent valve 406 is a 3-way valve that switches the flow of liquid solvent from the condenser 206 to either the first solvent tank 202 or the second solvent tank 204.

The liquid solvent valve 408 is a 2-way valve that controls the flow (on-off) of solvent from the first solvent tank 202 or the second solvent tank 204 to the reaction chamber 106. The liquid solvent valve 408 is operable to fill the reaction chamber 106 with solvent to soak plant matter.

The distillation inlet valve 410 is a 2-way valve that controls the flow of solvent or plant oil mixture from the reaction chamber 106 to the distillation column 102. The distillation inlet valve 410 is operable to drain reaction chamber 106 into the distillation column 102 after oil has leeched into the solvent.

The solvent vapor valve 504 is a 2-way valve that controls the flow of solvent vapor from the head space of the reaction chamber 106 to the pump 502. The solvent vapor valve 504 is operable to decrease pressure in the reaction chamber 106 to create pressure differential between the reaction chamber 106 and the solvent tanks. This pressure differential provides a motive force for moving solvent from the solvent tanks to the reaction chamber 106.

The solvent vapor valve 506 is a 2-way valve that controls the flow of solvent vapor from the distillation column 102 to the pump 502. The solvent vapor valve 506 is operable to (1) decrease pressure in the distillation column 102 to create a pressure differential between the distillation column 102 and the reaction chamber 106, providing motive force for moving solvent from the reaction chamber 106 to the distillation column 102, and (2) remove and condense distilled solvent vapor from the distillation column 102 and return it to the solvent tanks.

The solvent valve 508 is a 2-way valve that controls the flow of solvent from the pump 502 to the first solvent tank 202. The solvent valve 508 is operable to increase pressure in the first solvent tank 202, creating a pressure differential between the first solvent tank 202 and the reaction chamber 106. This pressure differential provides motive force for moving solvent from the first solvent tank 202 to the reaction chamber 106.

The solvent valve 510 is a 2-way valve that controls the flow of solvent from the pump 502 to the solvent vapor valve 504. The solvent valve 510 is operable to increase the pressure in the second solvent tank 204, creating a pressure differential between the solvent vapor valve 504 and the reaction chamber 106. This pressure differential provides motive force for moving solvent from the second solvent tank 204 to the reaction chamber 106.

The compressed air valve 512 is a 2-way valve that controls air flow from a compressed air source (e.g., an external air compressor) to the pneumatically actuated solvent pump 502. The compressed air valve 512 is operable to control the pump 502 (on-off).

The pressure sensor 806 measures a pressure differential between either of the solvent tanks and the distillation column 102 for passive distillation through the condenser 206. The reactor pressure transducer 610 measures a pressure differential between the reaction chamber 106 and the distillation column 102, to activate distillation inlet valve 410 to start draining the reactor when a minimum pressure is achieved. The pressure sensor 704 controls solvent vapor valve 402 during passive distillation, to end the process cycle when a minimum set pressure is achieved in the distillation column 102, and to control the vacuum pressure of distillation column 102.

The temperature sensor 804 provides measurements for temperature control of the solvent in both of the solvent tanks. The temperature sensor 614 provides readings for solvent temperature control in the reaction chamber 106 during soak of the plant matter. The temperature sensor 702 provides readings to control the temperature in the distillation column 102 during distillation.

The level sensors 802 measure the level of solvent in each of the solvent tanks. The lower level switch 616 provides an indication when the solvent in the reaction chamber 106 reaches or falls below a lower level, and the upper level switch 612 provides an indication when the solvent level in the reaction chamber 106 is at or above an upper level.

Figure 10:
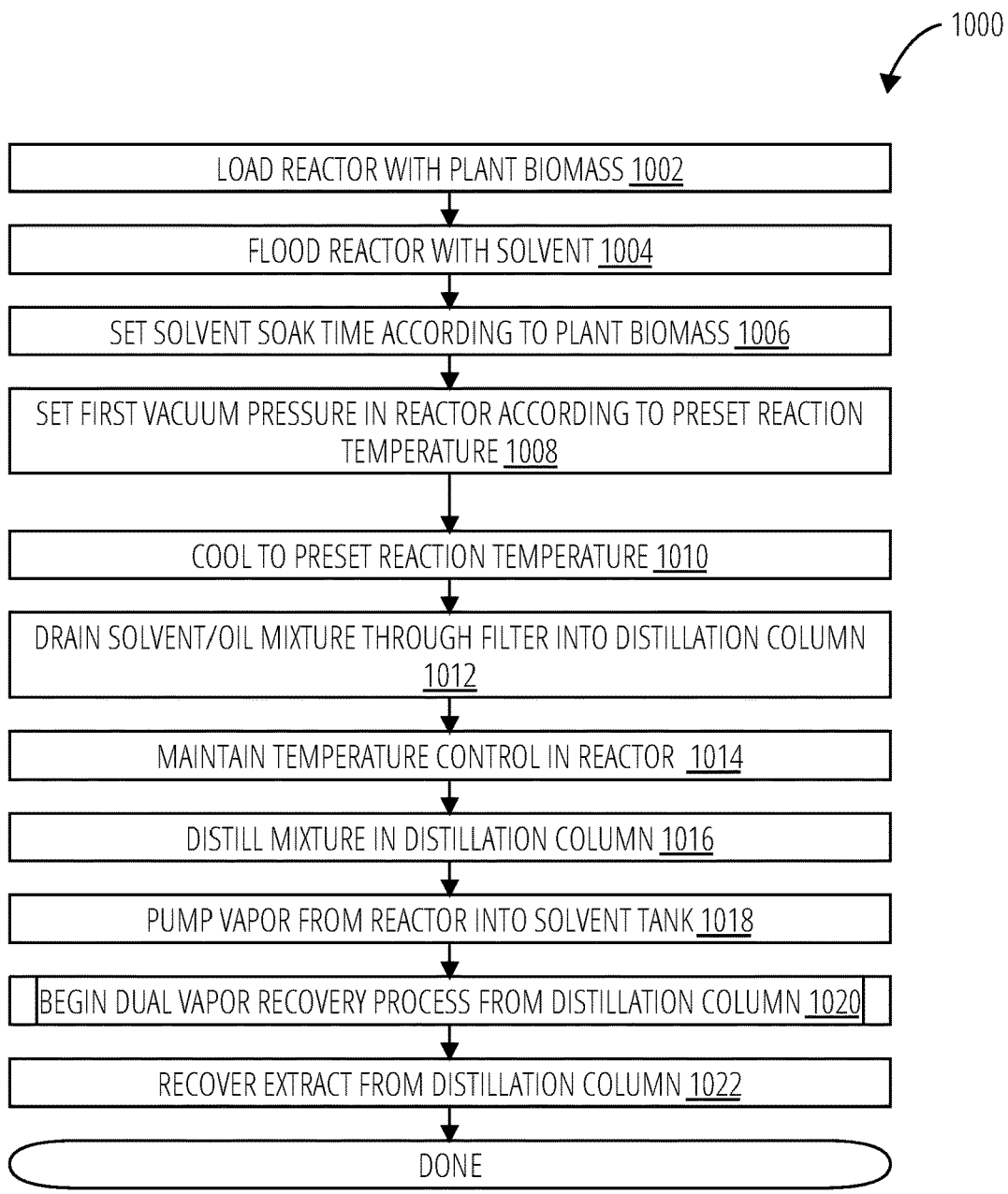
FIG. 10 illustrates a plant oil extraction process 1000 in accordance with one embodiment.
Figure 11:
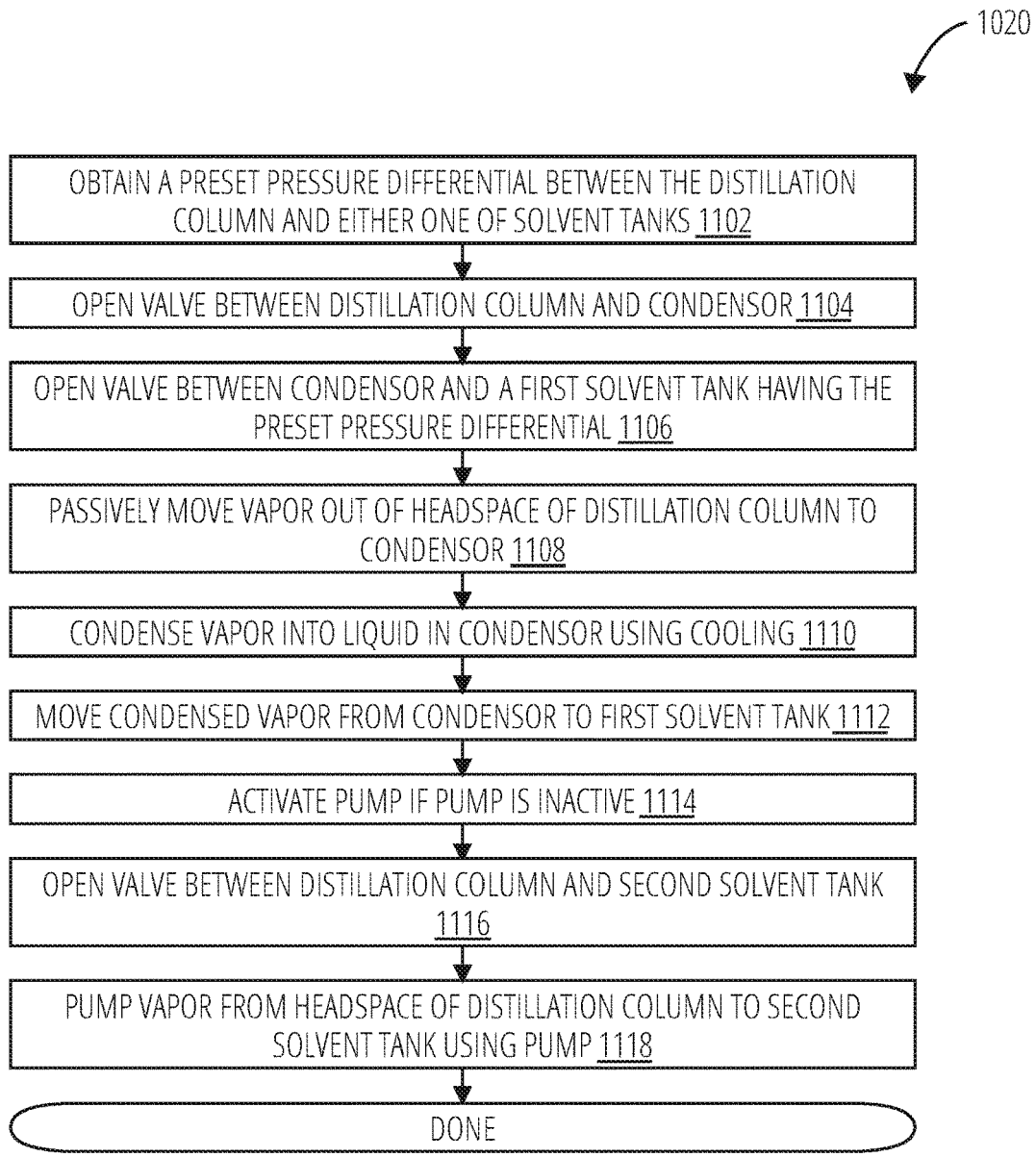
FIG. 11 illustrates a dual vapor recovery process 1020 in accordance with one embodiment.

To extract oil from plant biomass, the plant oil extraction system 100 may be operated according to the processes outlined in FIG. 10 and FIG. 11. First, plant biomass is loaded into the reaction chamber 106 (block 1002). Air is removed from the reaction chamber 106. Solvent is drawn from one or both of the solvent tanks, flooding the reaction chamber 106 (block 1004). Examples of the solvent that may be utilized are N-butane, ISO-butane, and/or propane. For example, the solvent may be a mixture of 25% ISO-butane, 50% N-butane, and 25% propane.

The plant biomass is soaked for a time (e.g., 20 minutes) that is determined by the mass of plant matter in the reaction chamber 106 (block 1006).

A cooling temperature for the extraction determines a vacuum pressure that is set in the reaction chamber 106 (e.g., 0 to −5 psi) (block 1008). The reaction chamber 106 is cooled (e.g., to between −20 C and −60 C) (block 1010) using the coolers 104. A lower reaction temperature yields oil with higher quality color and flavor. Higher reaction temperatures yield more chlorophyl, fats, and waxes, but the extraction process runs faster.

The solvent/oil mixture in the reaction chamber 106 is flowed through the filter bag 602 into the distillation column 102 (block 1012), creating a predetermined pressure (e.g., 5 psi) in the distillation column. The set reaction temperature in the reaction chamber 106 is carefully maintained while moving the solvent/oil mixture into the distillation column 102 (block 1014). The mixture is distilled (block 1016) and, for safety reasons, solvent vapor is removed from the reaction chamber 106 (block 1018). The dual vapor recovery process 1020 is initiated on the distillation column 102. Eventually, oil extracts are recovered from the distillation column 102 and removed for further processing.

The dual vapor recovery process 1020 is initiated as a result of attaining a preset pressure differential between the distillation column 102 and either one of the solvent tanks (e.g., 2 psi differential) (block 1102). At this point, a valve between the distillation column 102 and the condenser 206 is opened (block 1104) and a valve between the condenser 206 and solvent tank meeting the preset pressure differential is also opened (block 1106), to passively (using pressure differential, without the pump 502) move vapor out of the headspace of the distillation column 102 to the condenser 206 (block 1108), where the vapor is condensed into liquid using cooling (the condenser 206 is cooled by the coolers 104, e.g., using a heat transfer jacket) (block 1110). The condensed solvent is moved from the condenser 206 to the first solvent tank 202 (block 1112). This passive vapor recovery is the first branch of the dual vapor recovery process. For purposes of description, the target solvent tank of the passive vapor recovery shall be referred to in this example as the first solvent tank 202.

The pump 502 is also selectively activated (block 1114) concurrently with passive vapor recovery, to move vapor from the distillation column 102 into the solvent tank not used for passive vapor recovery (block 1116). In this example, that is the second solvent tank 204. The vapor recovered in this manner in condensed using high pressure, not cooling in the condenser 206. This is the second branch of the dual vapor recovery process.

The PLC 108 activates the pump 502 and valve selectively, only if the pump 502 is not in use for another aspect of the plant oil extraction process 1000. The PLC 108 then begins to pump vapor from the headspace of the distillation column 102 to the second solvent tank 204 (block 1118).

In continuous operation of the plant oil extraction system 100, the PLC 108 may further selectively open a valve between the second solvent tank 204 and the reaction chamber 106, once the pressure in the second solvent tank 204 is sufficient to move solvent into the reaction chamber 106 to repeat the plant oil extraction process 1000, and once sufficient solvent has been recovered in the second solvent tank 204 to flood the reaction chamber 106.

Figure 12:
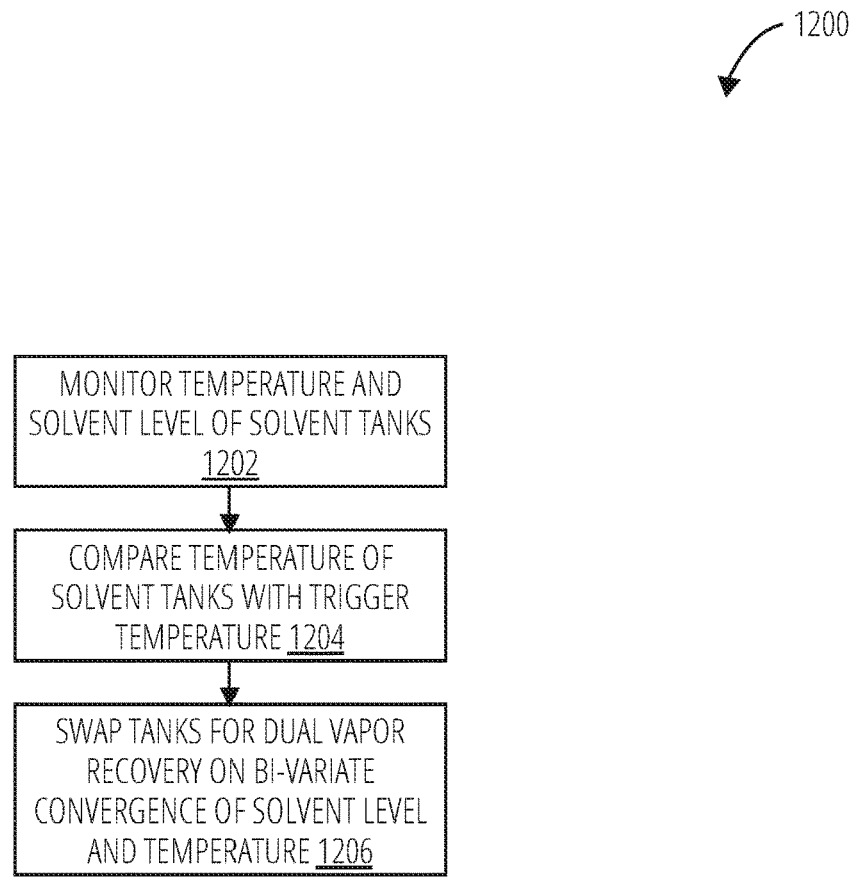
FIG. 12 illustrates a recovery tank swapping process 1200 in accordance with one embodiment.

Referring to FIG. 12, illustrating a tank swapping process 1200, at any time during the dual vapor recovery process, the PLC 108 may swap the target solvent tanks for the dual vapor recovery process, based on the amount of accumulated liquid solvent recovered in the tanks and the pressures and temperatures of each tank. For example, the PLC 108 may actively switch the first solvent tank 202 to be the target of active vapor recovery using the pump 502, and the second solvent tank 204 to be the target of passive vapor recovery, upon detecting a level of recovered liquid solvent in the first solvent tank 202 sufficient to flood the reaction chamber 106. Or, for example, the PLC 108 may actively switch (block 1206) the first solvent tank 202 to be the target of the active vapor recovery using the pump 502, and the second solvent tank 204 to be the target of passive vapor recovery, upon detecting (block 1202, 1204) a solvent temperature in solvent tank 202 that is closer to the target temperature for soaking the plant material and requiring a higher pressure in solvent tank 202 created by the active vapor recovery to flood the reaction chamber 106.

The liquid oil remaining in the distillation column 102 after the vapor is pulled out is the final product of the plant oil extraction system 100 and is removed for further processing into edibles and other uses.

The plant oil extraction system 100 thus utilizes a novel dual recovery process using the pump 502 and the condenser 206 and two recovery tanks, with a dual pressure differential. Through passive recovery, the distillation column 102 column and one of the solvent tanks are at a 0.5-5 psi (preferably 2 psi) pressure differential to trigger passive vapor recovery. During distillation, the distillation column 102 has an internal pressure from −3 psi to 50 psi, typically 5-20 psi, which reduces as solvent is drawn off as vapor. When a difference between the pressure in one of the solvent tanks, and the distillation column 102 reaches about 2 psi (the threshold difference in one embodiment), passive vapor recovery is initiated. Active vapor recovery involves a pressure differential that is much higher (e.g., distillation column 102 at 5 psi, solvent tank reaching as high as ~150 psi, preferably ~40 psi.

The distillation column 102 may in some embodiments have a height/diameter ratio of 1.0625. In some embodiments, each of the solvent tanks is sized to hold approximately (e.g., +−5%) 20% more solvent than the reaction chamber 106 can hold. This enables one batch of plant biomass to be distilled while another is soaking in the reaction chamber 106, and further enables the distillation process to be run repeatedly over the course of a workday, accounting for solvent loss at each cycle, without pausing the process to restock the solvent.

Implementations and Interpretation

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Hardware" in this context refers to logic embodied as analog or digital circuitry.

"Software" in this context refers to logic implemented as processor-executable instructions in a machine memory (e.g. read/write volatile or nonvolatile memory or media).

"Firmware" in this context refers to software logic embodied as processor-executable instructions stored in read-only memories or media.

The control methods for distillation disclosed herein may be embodied in hardware, software, or firmware, or combinations thereof. For example, the methods may be implemented as logic of a computer system, programmable logic controller, or printed circuit board, among numerous possibilities.

What is claimed is:

1. A distillation method in a system comprising a pump, the method comprising:
   draining a solvent-oil mixture from a reaction chamber into a distillation column;
   distilling the solvent-oil mixture in the distillation column;
   triggering a dual vapor recovery process from the distillation column as a result of attaining a first pressure differential between the distillation column and any one of a plurality of solvent tanks, each of the solvent tanks coupled to provide solvent to the reaction chamber;
   the dual vapor recovery process comprising:
     (a) opening a first vapor valve between the distillation column and a condenser;
     (b) opening a first solvent valve between the condenser and a first solvent tank meeting the first pressure differential;
     (c) using the first pressure differential to move vapor out of a headspace of the distillation column into the condenser without the use of the pump;
     (d) concurrently with (c) and on condition that the pump is not already in use to pump solvent:
       selectively activating the pump and opening a second vapor valve between the distillation column and a second solvent tank;
       pumping vapor from the headspace of the distillation column into the second solvent tank with the pump;
     (e) while (c) and (d) are underway:
       selectively opening a second solvent valve between the second solvent tank and the reaction chamber, once the pressure in the second solvent tank causes a second pressure differential sufficient to move solvent from the second solvent tank into the reaction chamber.

2. The distillation method of claim 1 the first pressure differential being approximately 2 psi.

3. The distillation method of claim 1, further comprising, while (c) and (d) are underway:
   switching the first solvent valve to the second solvent tank; and
   switching the second vapor valve to the first solvent tank.

4. The distillation method of claim 3, further comprising:
   triggering the switching of the first solvent valve and the second vapor valve based on an amount of accumulated liquid solvent in the solvent tanks and pressures and temperatures of each of the solvent tanks.

* * * * *